US012422329B2

(12) United States Patent
Ji et al.

(10) Patent No.: US 12,422,329 B2
(45) Date of Patent: Sep. 23, 2025

(54) FUNCTION VERIFICATION METHOD OF LIQUID LEAKAGE DETECTION MODULE

(71) Applicants: INVENTEC (PUDONG) TECHNOLOGY CORPORATION, Shanghai (CN); INVENTEC CORPORATION, Taipei (TW)

(72) Inventors: Jiaqing Ji, Shanghai (CN); Yi-dong Ji, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 293 days.

(21) Appl. No.: 18/209,999

(22) Filed: Jun. 14, 2023

(65) Prior Publication Data
US 2024/0402030 A1  Dec. 5, 2024

(30) Foreign Application Priority Data

Jun. 2, 2023  (CN) .......................... 202310648807.5

(51) Int. Cl.
*G01M 3/00* (2006.01)
*G01M 3/16* (2006.01)
(52) U.S. Cl.
CPC ............ *G01M 3/007* (2013.01); *G01M 3/165* (2013.01)

(58) Field of Classification Search
CPC .............................. G01M 3/007; G01M 3/165
See application file for complete search history.

(56) References Cited

U.S. PATENT DOCUMENTS

2003/0201158 A1* 10/2003 Andberg ............... G01M 3/165
200/61.04

FOREIGN PATENT DOCUMENTS

KR         20200106773 A  *  9/2020
RU            2027809 C1  *  1/1995

* cited by examiner

*Primary Examiner* — David Z Huang
(74) *Attorney, Agent, or Firm* — Maschoff Brennan (57) ABSTRACT

A function verification method of a liquid leak detection module comprises: installing a liquid leak detection cable to a main board; providing liquid to the liquid leak detection cable and obtaining time parameters including warning generation time; determining whether a sensitivity test is passed; disconnecting the liquid leakage detection cable from the main board, and confirming whether the liquid leakage detection module records an absence warning to determine whether an absence test is passed; after confirming that the liquid leakage detection cable is dry and connected to the main board, disabling and re-enabling a component on the main board, and then confirming whether the liquid leakage detection cable records a liquid leakage warning or an absence warning to determine whether a false-positive test is passed; when the sensitivity test, the absence test and the false-positive test are all passed, the function verification is completed.

10 Claims, 7 Drawing Sheets

FUNCTION VERIFICATION METHOD OF LIQUID LEAKAGE DETECTION MODULE

CROSS-REFERENCE TO RELATED APPLICATIONS

This non-provisional application claims priority under 35 U.S.C. § 119 (a) on Patent Application No(s). 202310648807.5 filed in China on Jun. 2, 2023 the entire contents of which are hereby incorporated by reference.

BACKGROUND

1. Technical Field

This disclosure relates to a method of verifying liquid leakage detection module.

2. Related Art

In recent years, due to the improvement of the computing performance of high-power chips, the requirements for chip heat dissipation have become increasingly stringent. It is expected that cold-plate liquid-cooled servers will gradually become mainstream in recent years. The difference between a liquid-cooled server and a traditional air-cooled server is that the internal high-power chips of the liquid-cooled server are cooled with water-cooling plates, and the cooling liquid is pumped into the water-cooling plate by an external device to take the heat away from the chip.

At present, the cooling liquid used in liquid-cooled servers developed in the industry is mainly deionized water. Deionized water has certain conductive characteristics, and direct contact with the server motherboard will cause the server main board to fail and be damaged. Therefore, the cold-plate liquid-cooled server is usually equipped with a corresponding liquid leakage detection cable in the cold plate module, so as to warn of liquid leakage in time. However, at present, most server equipment manufacturers do not have a unified standard for the verification method of the liquid leakage detection function. The verification method of liquid leakage detection is not rigorous, resulting in frequent false alarms of liquid leakage in the data center.

At present, most of the liquid leakage detection tests mainly have the following problems. There is no standardized functional verification process for the liquid leakage detection cable in the server system. The function of the liquid detection cable is only verified when the system is normal, and is not verified when the system is abnormal. The liquid leakage detection cable is only verified to warn in time without being confirmed that whether there is a possibility of false alarm of liquid leakage.

SUMMARY

Accordingly, this disclosure provides a function verification method of liquid leakage detection module.

According to one or more embodiment of this disclosure, a function verification method of a liquid leakage detection module, comprises installing a liquid leakage detection cable on a main board and electrically connecting it to the main board to form a liquid detection module; providing at least a predetermined amount of liquid to the liquid leakage detection cable and obtaining at least one time parameter including warning generation time corresponding to said at least a predetermined amount; determining whether a sensitivity test is passed according to the at least one time parameter; disconnecting the liquid leakage detection cable from the main board, and confirming whether the leakage detection module records an absence warning to determine whether an absence test is passed; after confirming that the liquid leakage detection cable is dry and properly connected to the main board, disabling and re-enabling at least one component on the main board, and then confirming whether the liquid leakage detection cable records a liquid leakage warning or the absence warning to determine whether a false-positive test is passed; when the sensitivity test, the absence test and the false-positive test are all passed, it is determined that the function verification of the liquid leakage detection module is completed.

In view of the above description, the function verification method of the liquid leakage detection module disclosed in the present application can establish a set of standard inspection procedures for the liquid leakage detection module using the liquid leakage detection cable, including the sensitivity test, the absence test and the false-positive test. The sensitivity test can quantify the sensitivity of the liquid leakage detection cable to the surrounding liquid leakage. The absence test can test whether there will be an absence warning when the liquid leakage detection cable is not properly connected to the main board. The false-positive test can test whether the components of the main board connected to the liquid leakage detection cable will cause false alarm (false-positive) due to malfunction of the liquid leakage detection module after experiencing abnormal conditions such as restarting and power failure. The function verification method of the liquid leakage detection module disclosed in the present application can be applied to the complete function verification of the liquid leakage detection module in different scenarios or objects.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
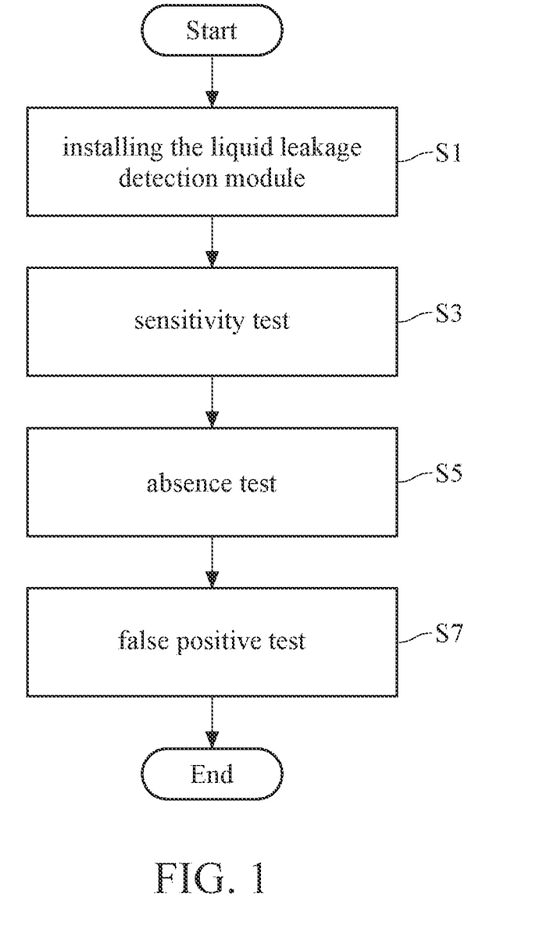
FIG. 1 is a flow chart of a function verification method of liquid leakage detection module according to an embodiment of the present disclosure.

Please refer to FIG. 1 which is a flow chart of a function verification method of liquid leakage detection module according to an embodiment of the present disclosure. As shown in FIG. 1, the function verification method of liquid leakage detection module of the present disclosure comprises performing: step S1: installing the liquid leakage detection module; step S3: sensitivity test; step S5: absence test; and step S7: false-positive test. In addition, the above steps of the function verification method of liquid leakage detection module of the present disclosure are not limited to be performed in the above-mentioned order.

In the present embodiment, step S1 is to install a liquid leakage detection cable on a main board, and electrically connect the liquid leakage detection cable to the main board to form a liquid leakage detection module. Step S3 is to provide at least a predetermined amount of liquid to the liquid leakage detection cable and obtain at least one time parameter, wherein the at least one time parameter includes warning generation time (duration) corresponding to the at least a predetermined amount, and then determine whether a sensitivity test is passed according to the at least one time parameter. Step S5 is to disconnect the liquid leakage detection cable from the main board, and confirm whether the leakage detection module records an absence warning to determine whether an absence test is passed. Step S7 is to, after confirming that the liquid leakage detection cable is dry and properly connected to the main board, disable and re-enable at least one component on the main board, and then confirm whether the liquid leakage detection cable records a liquid leak warning or the absence warning to determine whether a false-positive test is passed. Finally, when the sensitivity test, the absence test and the false-positive test are all passed, it is determined that the function verification of the liquid leakage detection module is completed.

Figure 2:
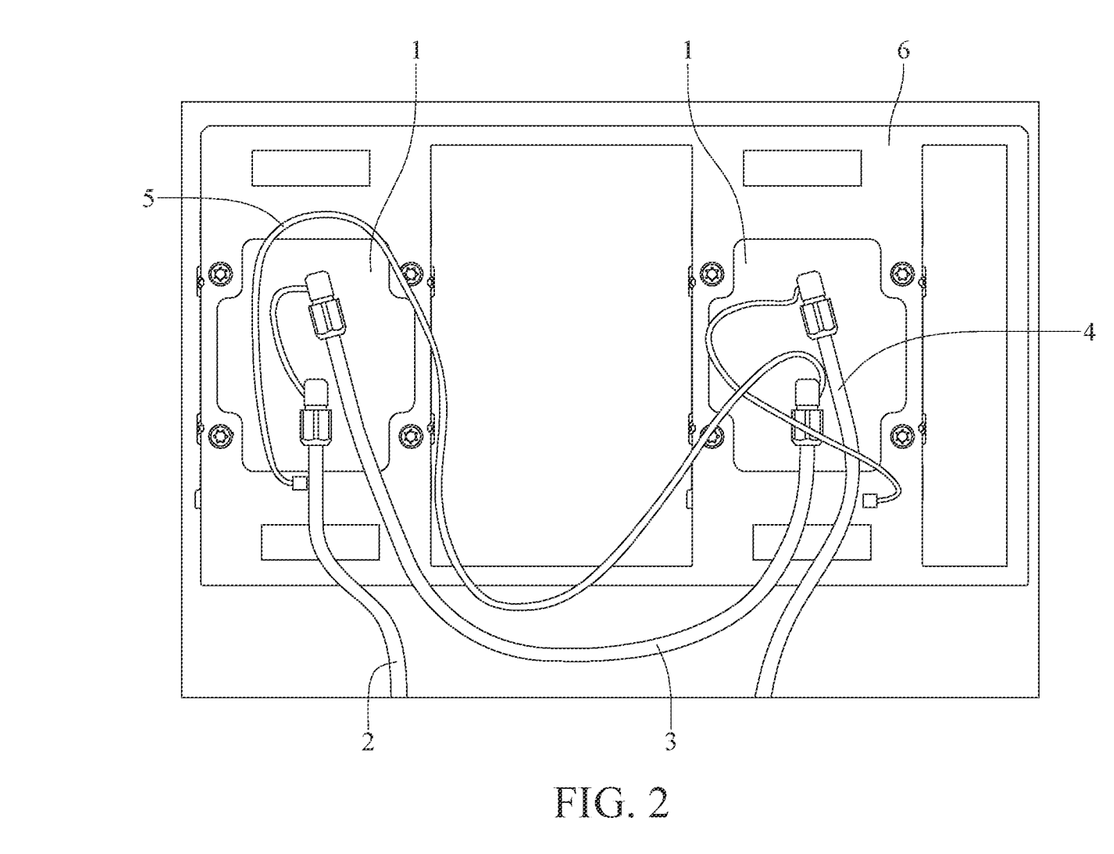
FIG. 2 is a configuration diagram of a liquid leakage detection module and a liquid cooling module according to an embodiment of the present disclosure.

Please refer to FIG. 2 which is a configuration diagram of a liquid leakage detection module and a liquid cooling module according to an embodiment of the present disclosure. As shown in FIG. 2, the liquid cooling plate 1 is disposed on the main board 6 at a position corresponding to the components that need to be cooled (such as processors), and receives liquid through a water inlet pipe 2 to dissipate heat. The liquid flows through the water inlet pipe 2, a connecting pipe 3 and a water outlet pipe 4, and then carries heat to the manifold (not shown) for heat dissipation, and then flows into the water inlet pipe 2 again after cooling down to form a cycle of the liquid cooling module. In this embodiment, a liquid cooling cycle is formed with two liquid cooling plates 1 connected in series through the connecting pipe 3, but the present disclosure is not limited thereto. In the present embodiment, the liquid leakage detection module includes the liquid leakage detection cables 5 and a detection unit (not shown) disposed on the main board 6. The liquid leakage detection cable 5 is connected to the main board 6 through a terminal and is adjacent to the liquid pipeline and the liquid cooling plates 1. The liquid leakage detection cable 5 is formed by two signal lines wrapped by a special water-absorbing material, so that when the liquid leakage detection cable 5 is in contact with conductive liquid (For example, when the liquid in the water inlet pipe 2, the connecting pipe 3 or the water outlet pipe 4 leaks and is in contact with the liquid leakage detection cable 5), the two signal lines will be short-circuited, and then the detection unit will receive the leakage signal and issue a liquid leakage warning. The detection unit can be implemented by elements with computing capabilities, such as operational amplifiers, comparators, and the like.

Figure 3:
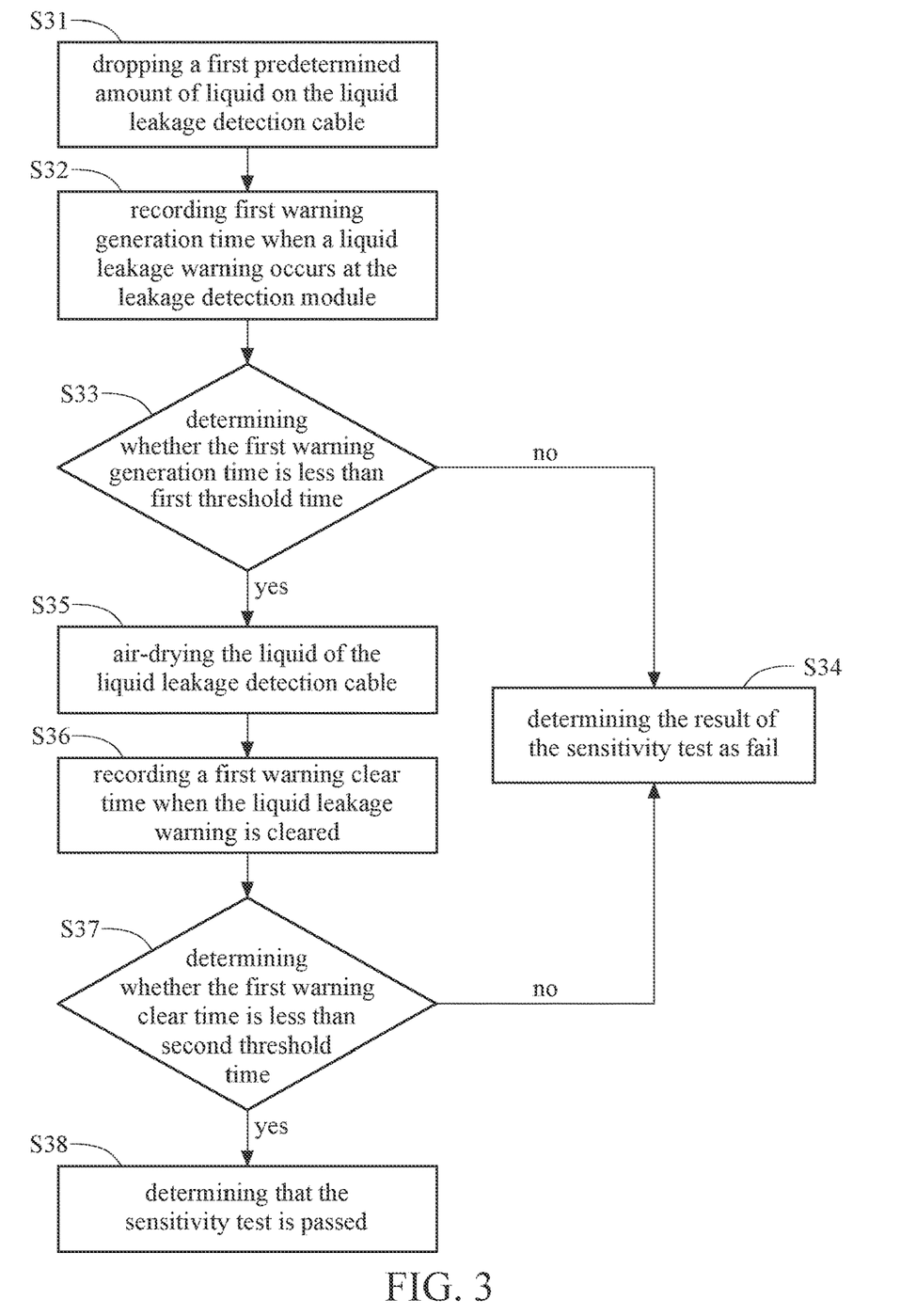
FIG. 3 is a flow chart of a sensitivity test of a function verification method of liquid leakage detection module according to an embodiment of the present disclosure.

Please refer to FIG. 3 which is a flow chart of a sensitivity test of a function verification method of liquid leakage detection module according to an embodiment of the present invention. As shown in FIG. 3, the process of the sensitivity test may include performing: step S31: taking a first predetermined amount of liquid and dropping the first predetermined amount of liquid on the liquid leakage detection cable; step S32: recording first warning generation time (duration) when a liquid leakage warning occurs at the leakage detection module; step S33: determining whether the first warning generation time (duration) is less than first threshold time (duration), if not, performing step S34, if it is, performing step S35; step S34: determining the result of the sensitivity test as fail; step S35: air-drying the liquid of the liquid leakage detection cable; step S36: recording first warning clear time in (duration) when the liquid leakage warning is cleared; step S37: determining whether the first warning clear time (duration) is less than second threshold time (duration), if not, performing step S34, if it is, performing step S38; and step S38: determining that the sensitivity test is passed.

Specifically, in step S31, an operator or a robot arm may drop 1 ml of deionized water on the liquid leakage detection cable, wherein the liquid leakage detection cable may be long enough to have multiple segments. That is, the deionized water may be dropped on different positions of the liquid leakage detection cable to completely perform the sensitivity test along the entire liquid leakage detection cable. In the present embodiment, the first predetermined amount is, as example, 1 milliliter, and the deionized water is used as the test liquid. However, in other embodiments, another suitable first predetermined amount and test liquid can be selected for the liquid cooling module and the liquid leakage detection module, which is not limited to the present application. Before performing step S32 of recording, the operator or the system processor (such as central processing unit, graphics processing unit or other computing elements) can clear backstage records (such as sel log code). In step S32, when the liquid leakage detection module generates a liquid leakage warning, the operator or the system processor records the first warning generation time. In step S33, the system processor determines whether the first warning generation time is less than the first threshold time, if it is, it means that the sensitivity of the liquid leakage detection cable is higher than a standard, if not, it means that the sensitivity of the liquid leakage detection cable is lower than the standard (that is, in step S34, failing to pass the sensitivity test). The first threshold time corresponds to the first predetermined amount. Further, the first threshold time has a negative correlation with the first predetermined amount, that is, a larger first predetermined amount may correspond to a shorter first threshold time (duration). In steps S35 and S36, after the liquid of the liquid leakage detection cable is air-dried, the operator or the system processor records the first warning clear time when the liquid leakage warning is cleared. In step S37, the system processor determines whether the first warning clear time is less than the second threshold time. Through the above-mentioned steps, the timeliness of the liquid leakage detection module to issue a warning after a liquid leakage occurs, and the timeliness of the liquid leakage detection module to clear the warning and returning to a normal state can be verified.

Figure 4:
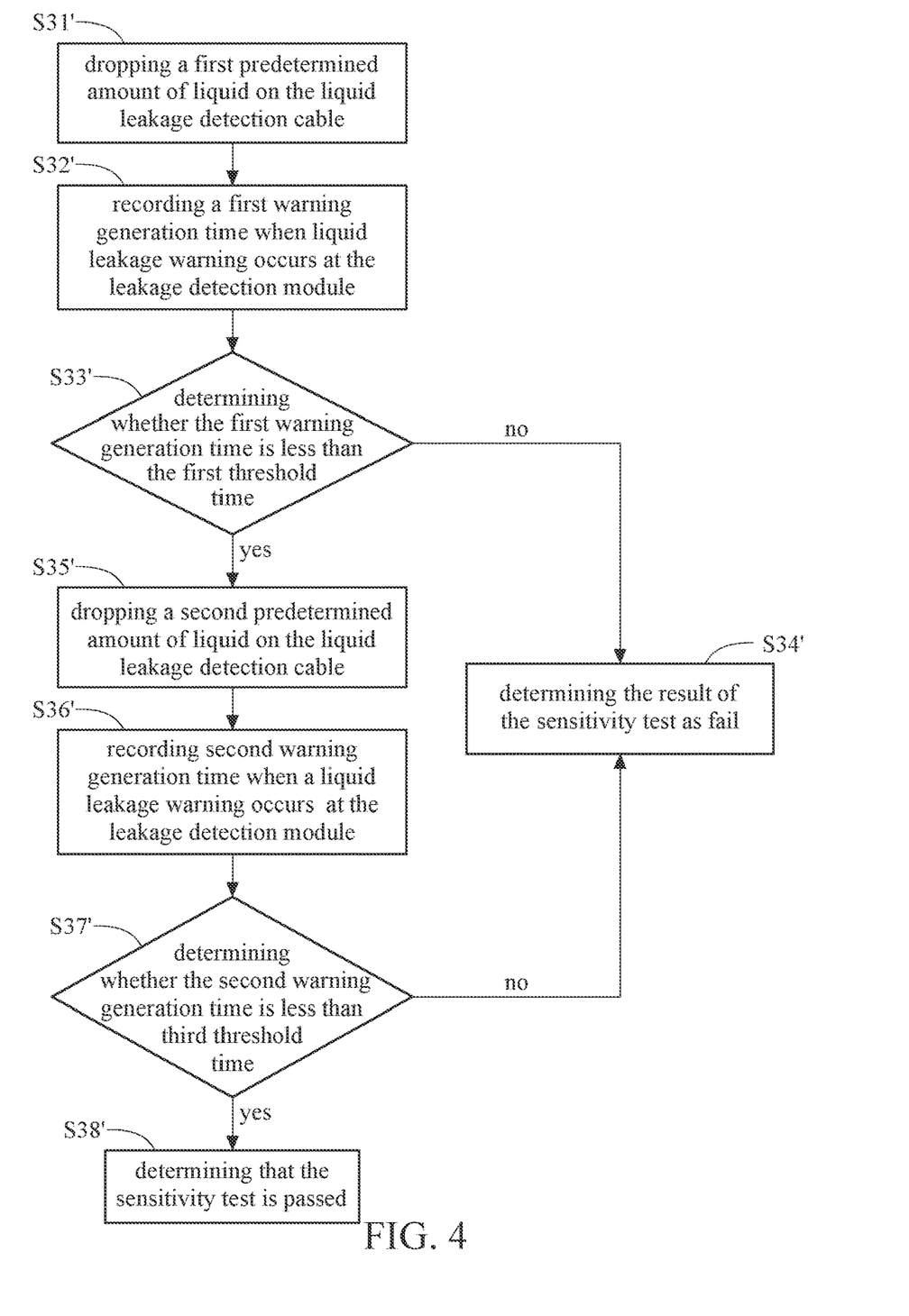
FIG. 4 is a flow chart of a sensitivity test of a function verification method of liquid leakage detection module according to another embodiment of the present disclosure.

In the above-mentioned processes, steps S35 to S37 are optional, that is, in step S33, when the system processor determines that the warning generation time is less than the threshold time, it can determine that the sensitivity test is passed (step S38). Please refer to FIG. 4 which is a flow chart of a sensitivity test of a function verification method of liquid leakage detection module according to another embodiment of the present invention. As shown in FIG. 4, the process of the sensitivity test may include performing: step S31': taking a first predetermined amount of liquid and dropping the first predetermined amount of liquid on the liquid leakage detection cable; step S32': recording first warning generation time when a liquid leakage warning occurs at the leakage detection module; step S33': determining whether the first warning generation time is less than the first threshold time, if not, performing step S34', if it is, performing step S35'; step S34': determining the result of the sensitivity test as fail; step S35': taking a second predetermined amount of liquid and dropping the second predetermined amount of liquid on the liquid leakage detection cable; step S36': recording second warning generation time when a liquid leakage warning occurs at the leakage detection module; step S37': determining whether the second warning generation time is less than third threshold time, if not, performing step S34', if it is, performing step S38'; and step S38': determining that the sensitivity test is passed.

Steps S31' to S34' and step S38' in the present embodiment can be the same as steps S31 to S34 and step S38 in the previous embodiment, so the repeated description is omitted here. In step S35', the operator or the robot arm can drop 2 milliliters of deionized water on the leakage sensing cable. In the present embodiment, the first predetermined amount and the second predetermined amount are respectively 1 milliliter and 2 milliliters, but in other embodiments, an appropriate predetermined amount can be selected for the liquid cooling module and the liquid leakage detection module, which is not limited to the present application. In step S36', when the liquid leakage detection module generates a liquid leakage warning, the operator or the system processor records the second warning generation time. In step S37', the system processor determines whether the second warning generation time is less than the third threshold time, if it is, it means that the sensitivity of the liquid leakage detection cable is higher than the standard, if not, it means that the sensitivity of the liquid leakage detection cable is lower than the standard (that is, in step S34', failing to pass the sensitivity test). The third threshold time corresponds to the second predetermined amount. Further, the third threshold time has a negative correlation with the second predetermined amount, that is, a larger second predetermined amount may correspond to a shorter third threshold time.

Compared with the previous embodiment, the sensitivity test of the present embodiment selectively tests the sensitivity of the liquid leakage detection module to the second predetermined amount of liquid. Similarly, in other embodiments, process for other predetermined amount of liquids may be included in the sensitivity test. In addition, the process of performing the sensitivity test for multiple predetermined amount of liquid may also include air-drying the liquid and recording the warning clear time (such as steps S35 to S37). That is, the sensitivity test of the function verification method of liquid leakage detection module in the present embodiment is not limited to the aspects shown in FIG. 3 and FIG. 4, but could include various combinations of the processes shown in FIG. 3 and FIG. 4. For example, 1/2/3/4/5 milliliters of deionized water can be used to test the sensitivity of the liquid leakage detection module respectively, and test process of each predetermined amount can include the test of air-drying the liquid and recording the warning clear time, to determine whether the warning generation time of each predetermined amount is less than the corresponding threshold time and whether the warning clear time is less than the corresponding threshold time to obtain multiple results (for example, 1st to 5th results). Finally, whether the leakage detection module passes the sensitivity test can be determined.

Figure 5:
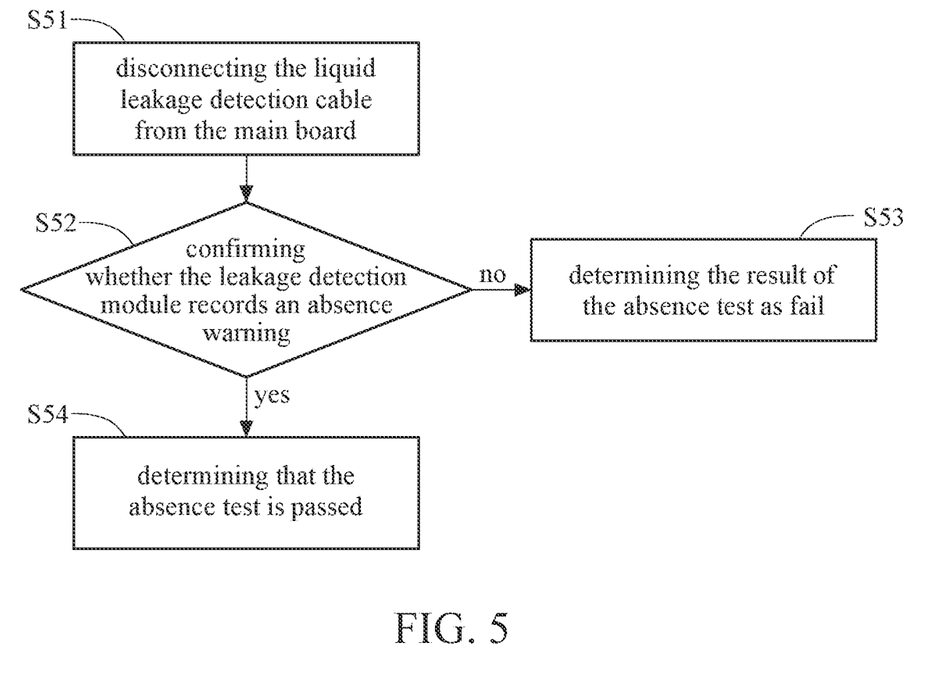
FIG. 5 is a flow chart of an absence test of a function verification method of liquid leakage detection module according to an embodiment of the present disclosure.

Please refer to FIG. 5 which is a flow chart of an absence test of a function verification method of liquid leakage detection module according to an embodiment of the present invention. As shown in FIG. 5, the process of the absence test may include performing: step S51: disconnecting the liquid leakage detection cable from the main board; step S52: confirming whether the leakage detection module records an absence warning, if not, performing step S53, if it is, performing step S54; step S53: determining the result of the absence test as fail; and step S54: determining that the absence test is passed.

Specifically, in the present embodiment, the liquid leakage detection cable may be connected to the main board through a connector, so in step S31, the operator or the robot arm can disconnect the connection between a terminal of the liquid leakage detection cable and the connector, to simulate actual connection problems between the liquid leakage detection cable and the main board that may be caused by external force factors or installation problems. The detection unit of the liquid leakage detection module can detect the signal from the liquid leakage detection cable and generate an absence warning according to the disconnection between the liquid leakage detection cable and the main board. Before performing the confirmation in step S52, the operator or the system processor can first clear the records in the backstage (such as the sel log code). In step S52, the operator or the system processor can confirm whether the liquid leakage detection module has recorded an absence warning. In steps S53 and S54, if the liquid leakage detection module has recorded an absence warning, the absence test is passed; otherwise, the absence test is failed. It should be noted that the liquid leakage detection module can include multiple liquid leakage detection cables, and each liquid leakage detection cable can include two terminals for connection, so steps S51 and S52 in the present embodiment can be performed for each terminal to repeat the detection, wherein if multiple detection results show all the tests are passed, it is determined that the whole liquid leakage module pass the absence test.

Figure 6:
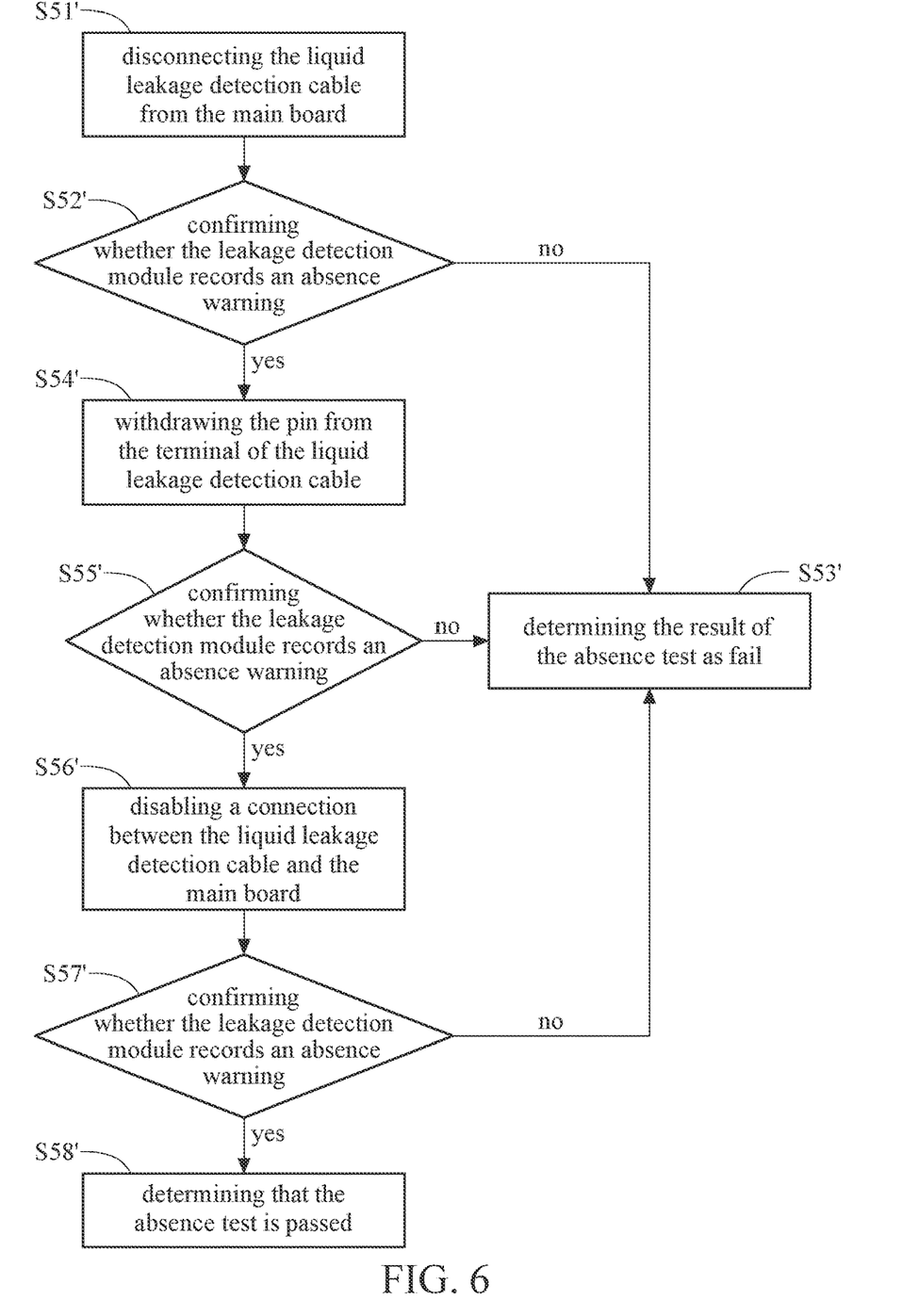
FIG. 6 is a flow chart of an absence test of a function verification method of liquid leakage detection module according to another embodiment of the present disclosure.

Please refer to FIG. 6 which is a flow chart of an absence test of a function verification method of liquid leakage detection module according to another embodiment of the present invention. As shown in FIG. 6, the process of the absence test may include performing: step S51': disconnecting the liquid leakage detection cable from the main board; step S52': confirming whether the leakage detection module records an absence warning, if not, performing step S53', if it is, performing step S54'; step S53': determining the result of the absence test as fail; and step S54': withdrawing the pin from the terminal of the liquid leakage detection cable; step S55': confirming whether the leakage detection module records an absence warning, if not, performing step S53', if it is, performing step S56'; step S56': disabling a connection between the liquid leakage detection cable and the main board; step S57': confirming whether the leakage detection module records an absence warning, if not, performing step S53', if it is, performing step S58'; and step S58': determining that the absence test is passed.

In the present embodiment, steps S51' to S53' and step S58' can be the same as steps S51 to S53 and step S54 of the previous embodiment, and steps S52', S55' and S57' are the same, so repeated descriptions are omitted herein. In the present embodiment, through steps S51'. S54' and S56', the problems that may arise from the connection between the liquid leakage detection cable and the main board are tested respectively, so as to ensure that no matter what kind of connection problems occur, the absence warning will occur. Specifically, the terminal of the liquid leakage detection cable may not be properly connected to the mainboard, so in step S51' the operator or the robot arm tests to disconnect one terminal of the liquid leakage detection cable from the mainboard. The terminal of the liquid leakage detection cable may have the problem of pin-withdrawn causing a poor connection. Therefore, in step S54', the operator or the robot arm tests to withdraw the pin from the terminal of the liquid leakage detection cable. There may be a disconnection problem between the liquid leakage detection cable and the main board, so in step S56' the operator or the robot arm tests to disconnect the liquid leakage detection cable from the main board.

Figure 7:
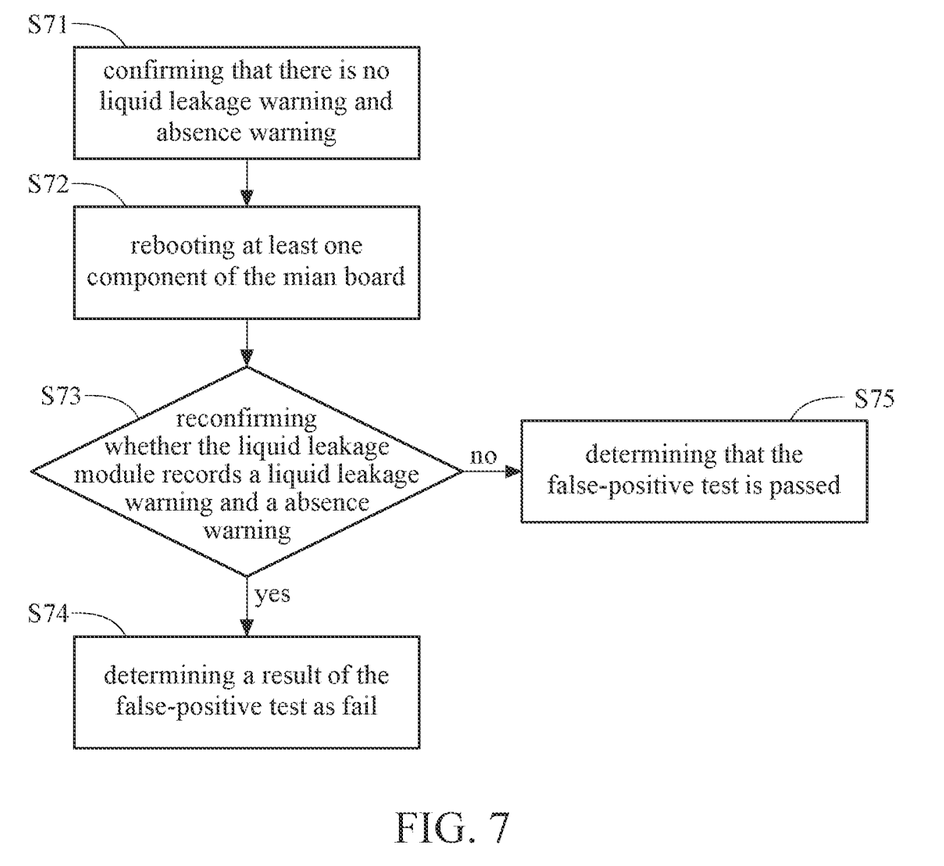
FIG. 7 is a flow chart of a false-positive test of a function verification method of liquid leakage detection module according to an embodiment of the present disclosure.

Please refer to FIG. 7 which is a flow chart of a false-positive test of a function verification method of liquid leakage detection module according to an embodiment of the present invention. As shown in FIG. 7, the process of the false-positive test may include performing: step S71: confirming that there is no liquid leakage warning and absence warning recorded by the liquid leakage module; step S72: rebooting at least one component of the main board; step S73: reconfirming whether the liquid leakage module records a liquid leakage warning and a absence warning, if it is, performing step S74, if not, performing step S75; step S74: determining a result of the false-positive test as fail; and step S75: determining that the false-positive test is passed.

Specifically, before performing the confirmation in step S71, the operator or the system processor can first clear the records in the backstage (such as the sel log code). In step S71, the operator or the system processor can confirm that there is no liquid leakage in the liquid cooling module, and that there is a proper connection between the liquid leakage detection cable and the main board, and then can reconfirm that there is no liquid leakage warning and absence warning recorded by the liquid leakage module. In this way, it can ensure that the liquid leakage detection module and the liquid cooling module are in a normal state. In step S72, the operator or the system processor can reboot the detection unit of the main board. In step S73, the operator or the system processor can reconfirm whether the liquid leakage detection module records the liquid leakage warning and the absence warning. If it is, it means that the detection unit undergoing the reboot has a false-positive problem, so it fails to pass the false-positive test; if not, it means that the detection module does not generate a false-positive warning, so the false-positive test is passed.

Variations of the present embodiment are described below. In step S72, rebooting at least one component of the main board can be implemented in other ways. For example, the operator or the system processor can power off the liquid leakage detection module or the main board and then power it on again, so as to simulate a possible power trip situation of the system. On the other hand, the present embodiment mainly tests for false-positive problems, but in other embodiments, tests for false negatives can also be performed. For example, the process of the false-negative test may include: confirming that there is a liquid leakage warning or an absence warning recorded by the liquid leakage module (corresponding to step S71); rebooting at least one component of the main board (corresponding to step S72); reconfirming whether the liquid leakage module records a liquid leakage warning and a absence warning (corresponding to step S73); if not, it is determined that the result of the false-negative test is not passed (corresponding to step S74); if so, it is determined that the false-negative test is passed (corresponding to step S75).

The data and results of various tests described above can be recorded and presented through transmission to the backstage database, and the present application is not limited to the implementation of various human-computer interaction interfaces.

In view of the above description, the function verification method of the liquid leakage detection module disclosed in the present application can establish a set of standard inspection procedures for the liquid leakage detection module using the liquid leakage detection cable, including the sensitivity test, the absence test and the false-positive test. The sensitivity test can quantify the sensitivity of the liquid leakage detection cable to the surrounding liquid leakage. The absence test can test whether there will be an absence warning when the liquid leakage detection cable is not properly connected to the main board. The false-positive test can test whether the components of the main board connected to the liquid leakage detection cable will cause false alarm (false-positive/false negative) due to malfunction of the liquid leakage detection module after experiencing abnormal conditions such as restarting and power failure. The function verification method of the liquid leakage detection module disclosed in the present application can be applied to the complete function verification of the liquid leakage detection module in different scenarios or objects.

What is claimed is:

1. A function verification method of liquid leakage detection module, comprising:
    installing a liquid leakage detection cable on a main board and electrically connecting the liquid leakage detection cable to the main board to form a liquid detection module;
    providing at least a predetermined amount of liquid to the liquid leakage detection cable and obtaining at least one time parameter including a warning generation time corresponding to said at least a predetermined amount;
    determining whether a sensitivity test is passed according to the at least one time parameter;
    disconnecting the liquid leakage detection cable from the main board, and confirming whether the leakage detection module records an absence warning to determine whether an absence test is passed;
    after confirming that the liquid leakage detection cable is dry and connected to the main board, disabling and re-enabling at least one component on the main board, and then confirming whether the liquid leakage detection cable records a liquid leakage warning or the absence warning to determine whether a false-positive test is passed; and
    when the sensitivity test, the absence test and the false-positive test are all passed, determining that function verification of the liquid leakage detection module is completed.

2. The function verification method of liquid leakage detection module of claim 1, wherein providing said at least a predetermined amount of liquid to the liquid leakage detection cable and obtaining the at least one time parameter including the warning generation time corresponding to said at least a predetermined amount comprises:
- taking a first predetermined amount of liquid and dropping the first predetermined amount of liquid on the liquid leakage detection cable; and
- recording a first warning generation time when a liquid leakage warning occurs at the leakage detection module, and
- wherein determining whether the sensitivity test is passed according to the at least one time parameter comprises:
  - when the first warning generation time is not less than a first threshold time, determining a first result of the sensitivity test as fail.

3. The function verification method of liquid leakage detection module of claim 2, wherein the at least one time parameter further comprises a warning clear time, and providing said at least a predetermined amount of liquid to the liquid leakage detection cable and obtaining the at least one time parameter further comprises:
- air-drying the first predetermined amount of the liquid of the liquid leakage detection cable; and
- recording a first warning clear time when the liquid leakage detection module clears the liquid leakage warning, and
- wherein determining whether the sensitivity test is passed according to the at least one time parameter comprises:
  - when the first warning generation time is less than the first threshold time, and the first warning clear time is less than a second threshold time, determining the first result of the sensitivity test as pass.

4. The function verification method of liquid leakage detection module of claim 2, wherein providing said at least a predetermined amount of liquid to the liquid leakage detection cable and obtaining the at least one time parameter further comprises:
- taking a second predetermined amount of liquid and dropping the second predetermined amount of liquid on the liquid leakage detection cable, wherein the second predetermined amount is different from the first predetermined amount; and
- recording a second warning generation time when the liquid leakage warning occurs at the leakage detection module,
- wherein determining whether the sensitivity test is passed according to the at least one time parameter further comprises:
  - when the second warning generation time is not less than a third threshold time, determining a second result of the sensitivity test as fail.

5. The function verification method of liquid leakage detection module of claim 3, wherein providing said at least a predetermined amount of liquid to the liquid leakage detection cable and obtaining the at least one time parameter further comprises:
- taking a second predetermined amount of liquid and dropping the second predetermined amount of liquid on the liquid leakage detection cable, wherein the second predetermined amount is different from the first predetermined amount;
- recording a second warning generation time when the liquid leakage warning occurs at the leakage detection module;
- air-drying the second predetermined amount of the liquid of the liquid leakage detection cable; and
- recording a second warning clear time when the liquid leakage detection module clears the liquid leakage warning, and
- wherein determining whether the sensitivity test is passed according to the at least one time parameter further comprises:
  - when the second warning generation time is less than a third threshold time, and the second warning clear time is less than a fourth threshold time, determining a second result of the sensitivity test as pass.

6. The function verification method of liquid leakage detection module of claim 1, wherein disconnecting the liquid leakage detection cable from the main board, and confirming whether the leakage detection module records the absence warning to determine whether the absence test is passed comprises:
- disconnecting a terminal of the liquid leakage detection cable from the main board;
- confirming whether the leakage detection module records the absence warning as a first result; and
- when the first result does not indicate the absence warning, determining that a result of the absence test as fail.

7. The function verification method of liquid leakage detection module of claim 6, wherein disconnecting the liquid leakage detection cable from the main board, and confirming whether the leakage detection module records the absence warning to determine whether the absence test is passed further comprises:
- withdrawing a pin from the terminal of the liquid leakage detection cable;
- confirming whether the leakage detection module records the absence warning as a second result; and
- when the second result does not indicate the absence warning, determining a result of the absence test as fail.

8. The function verification method of liquid leakage detection module of claim 7, wherein disconnecting the liquid leakage detection cable from the main board, and confirming whether the leakage detection module records the absence warning to determine whether the absence test is passed further comprises:
- disabling a connection between the liquid leakage detection cable and the main board;
- confirming whether the leakage detection module records the absence warning as a third result; and
- when the first result, the second result and the third result all indicate the absence warning, determining that the absence test is passed.

9. The function verification method of liquid leakage detection module of claim 1, wherein after confirming that the liquid leakage detection cable is dry and connected to the main board, disabling and re-enabling the at least one component on the main board, and then confirming whether the liquid leakage detection cable records the liquid leakage warning or the absence warning to determine whether the false-positive test is passed comprises:
- confirming that there is no liquid leakage warning and absence warning recorded by the liquid leakage module;
- rebooting the at least one component of the main board;
- reconfirming whether the liquid leakage module records the liquid leakage warning and the absence warning; and
- if there is no liquid leakage warning and absence warning recorded by the liquid leakage module, determining that the false-positive test is passed.

10. The function verification method of liquid leakage detection module of claim 1, wherein after confirming that the liquid leakage detection cable is dry and connected to the main board, disabling and re-enabling the at least one component on the main board, and then confirming whether the liquid leakage detection cable records the liquid leakage warning or the absence warning to determine whether the false-positive test is passed comprises:
- confirming that there is no liquid leakage warning and absence warning recorded by the liquid leakage module;
- powering off the liquid leakage detection module and then powering the liquid leakage detection module on again;
- reconfirming whether the liquid leakage module records the liquid leakage warning and the absence warning; and
- if there is no liquid leakage warning and absence warning recorded by the liquid leakage module, determining that the false-positive test is passed.

* * * * *